(12) United States Patent
Weaver

(10) Patent No.: US 7,647,464 B2
(45) Date of Patent: Jan. 12, 2010

(54) METHODS, SYSTEMS, AND PRODUCTS FOR RECORDING MEDIA TO A RESTORATION SERVER

(75) Inventor: Timothy H. Weaver, Alpharetta, GA (US)

(73) Assignee: AT&T Intellectual Property, I,L.P., Wilmington, DE (US)

( * ) Notice: Subject to any disclaimer, the term of this patent is extended or adjusted under 35 U.S.C. 154(b) by 0 days.

(21) Appl. No.: 11/703,359

(22) Filed: Feb. 7, 2007

(65) Prior Publication Data

US 2007/0255915 A1 Nov. 1, 2007

Related U.S. Application Data

(63) Continuation-in-part of application No. 11/413,886, filed on Apr. 28, 2006, now abandoned.

(51) Int. Cl.
*G06F 12/16* (2006.01)
(52) U.S. Cl. .................................................. 711/162
(58) Field of Classification Search ........................ None
See application file for complete search history.

(56) References Cited

U.S. PATENT DOCUMENTS

| | | | |
|---|---|---|---|
| 4,903,130 A | 2/1990 | Kitagawa et al. | |
| 5,255,180 A | 10/1993 | Shinoda et al. | |
| 5,313,282 A | 5/1994 | Hayashi | |
| 5,331,354 A | 7/1994 | Koyama et al. | |
| 5,576,755 A * | 11/1996 | Davis et al. | 725/48 |
| 5,594,924 A * | 1/1997 | Ottesen et al. | 710/31 |
| 5,630,104 A * | 5/1997 | Ottesen et al. | 703/24 |
| 5,652,615 A | 7/1997 | Bryant et al. | |
| 5,731,764 A | 3/1998 | Tanaka | |
| 5,751,282 A * | 5/1998 | Girard et al. | 715/721 |
| 5,774,170 A | 6/1998 | Hite | |
| 6,006,257 A | 12/1999 | Slezak | |
| 6,009,409 A | 12/1999 | Adler et al. | |
| 6,078,589 A | 6/2000 | Kuechler | |
| 6,237,022 B1 | 5/2001 | Bruck | |
| 6,252,588 B1 | 6/2001 | Dawson | |
| 6,307,550 B1 | 10/2001 | Chen | |
| 6,317,165 B1 | 11/2001 | Balram | |
| 6,324,182 B1 | 11/2001 | Burns | |
| 6,345,293 B1 | 2/2002 | Chaddha | |
| 6,446,261 B1 | 9/2002 | Rosser | |
| 6,460,075 B2 | 10/2002 | Krueger | |
| 6,591,423 B1 | 7/2003 | Campbell | |
| 6,636,953 B2 * | 10/2003 | Yuasa et al. | 711/161 |
| 6,647,411 B2 | 11/2003 | Towell | |
| 6,698,020 B1 | 2/2004 | Zigmond et al. | |
| 6,757,796 B1 | 6/2004 | Hofmann | |
| 6,771,644 B1 | 8/2004 | Brassil et al. | |
| 6,791,622 B2 | 9/2004 | Zeidler | |
| 6,870,463 B2 | 3/2005 | Dresti et al. | |
| 6,882,793 B1 | 4/2005 | Fu | |
| 6,963,903 B2 | 11/2005 | Krueger | |
| 7,010,720 B2 * | 3/2006 | Maeda et al. | 714/7 |

(Continued)

*Primary Examiner*—Kevin Verbrugge
(74) *Attorney, Agent, or Firm*—Cantor Colburn LLP

(57) ABSTRACT

Methods, devices, and products are disclosed for recording media. An input is received via a user interface to record media. An entry is created in a recording schedule to record the media. The recording schedule is sent to a restoration server, such that the recording schedule is mirrored to the restoration server.

17 Claims, 11 Drawing Sheets

U.S. PATENT DOCUMENTS

| | | | |
|---|---|---|---|
| 7,027,460 B2 * | 4/2006 | Iyer et al. | 370/429 |
| 7,120,871 B1 * | 10/2006 | Harrington | 715/205 |
| 7,254,622 B2 * | 8/2007 | Nomura et al. | 709/219 |
| 2001/0020298 A1 * | 9/2001 | Rector et al. | 725/50 |
| 2001/0037376 A1 * | 11/2001 | Ullman et al. | 709/218 |
| 2002/0028026 A1 | 3/2002 | Chen | |
| 2002/0108127 A1 | 8/2002 | Lew | |
| 2002/0112005 A1 | 8/2002 | Namias | |
| 2002/0133830 A1 | 9/2002 | Kim | |
| 2002/0186959 A1 * | 12/2002 | Young et al. | 386/83 |
| 2003/0067554 A1 | 4/2003 | Klarfeld | |
| 2003/0088687 A1 | 5/2003 | Begeja | |
| 2003/0088878 A1 | 5/2003 | Rogers | |
| 2003/0093808 A1 * | 5/2003 | Eyer et al. | 725/111 |
| 2003/0118014 A1 * | 6/2003 | Iyer et al. | 370/389 |
| 2003/0139134 A1 | 7/2003 | Bailey et al. | |
| 2004/0031058 A1 | 2/2004 | Reisman | |
| 2004/0078814 A1 | 4/2004 | Allen | |
| 2004/0131357 A1 | 7/2004 | Farmer et al. | |
| 2004/0168186 A1 * | 8/2004 | Rector et al. | 725/39 |
| 2004/0210944 A1 | 10/2004 | Brassil et al. | |
| 2004/0255336 A1 | 12/2004 | Logan | |
| 2004/0268407 A1 | 12/2004 | Sparrell et al. | |
| 2004/0268410 A1 | 12/2004 | Barton | |
| 2005/0081252 A1 | 4/2005 | Chefalas | |
| 2006/0029093 A1 | 2/2006 | Van Rossum | |
| 2006/0085817 A1 * | 4/2006 | Kim et al. | 725/34 |
| 2006/0093325 A1 * | 5/2006 | Imai et al. | 386/83 |

* cited by examiner

METHODS, SYSTEMS, AND PRODUCTS FOR RECORDING MEDIA TO A RESTORATION SERVER

CROSS-REFERENCE TO RELATED APPLICATIONS

This application is a continuation-in-part of U.S. application Ser. No. 11/413,886, filed Apr. 28, 2006 now abandoned, and entitled incorporated herein by reference in its entirety.

This application also relates to the following co-pending and commonly-assigned applications, with each application incorporated herein by reference: U.S. application Ser. No 11/300,125, filed Dec. 14, 2005 and entitled "Presence Detection in a Bandwidth Management System"; U.S. application Ser. No. 11/300,061, filed Dec. 14, 2005 and entitled "Methods, Systems, and Devices for Bandwidth Conservation"; U.S. application Ser. No. 11/178,075, filed Jul. 8, 2005 and entitled "Methods, Systems, and Devices for Securing Content"; U.S. application Ser. No. 11/304,264, filed Dec. 14, 2005 and entitled "Methods, Systems, and Computer Program Products For Providing Traffic Control Services"; U.S. application Ser. No. 11/703,573, concurrently filed and entitled "Methods, Systems, and Products for Conserving Bandwidth"; U.S. application Ser. No. 11/703,352, concurrently filed and entitled "Methods and Systems for Image Processing"; U.S. application Ser. No. 11/703,574, concurrently filed and entitled "Methods, Systems, and Products for Recording Media"; U.S. application Ser. No. 11/703,325, concurrently filed and entitled "Methods, Systems, and Products for Targeting Media"; and U.S. application Ser. No. 11/703,565, concurrently filed and entitled "Methods, Systems, and Products for Restoring Media".

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This application generally relates to interactive multimedia distribution systems and, more particularly, to recording or to copying of media.

Hard drives, and other memory devices, sometimes fail. The fear of failure haunts anyone who stores business data, precious home movies, pictures, and any other media content. As digital video recorders grow in popularity, for example, more and more users have a significant time and financial investment in a library of media stored to their recorder. Should the digital recorder experience a memory or other hardware failure, and some or all of that library is lost, the user may lose data and memories of great financial and sentimental value. What is needed, then, are methods, systems, and products that provide a restoration service for recorded media.

SUMMARY

The aforementioned problems, and other problems, are reduced, according to exemplary embodiments, by methods, systems, and products that help record and restore media. These exemplary embodiments describe how a user may obtain a restoration service from a service provider. Exemplary embodiments maintain at least a partial image of recorded content on a user's device. The user, for example, may store a recorded collection of media on his or her digital recorder, computer, wireless phone, or any other communications device. The term "media" includes movies, pictures, images, music, text, programs, and data. Whenever a user schedules media for recording, exemplary embodiments communicate that recording schedule to a restoration server. The restoration server may then record a duplicate copy of the media. If the restoration server already stores the media, however, then the restoration server may decline to record a duplicate copy of the media. If ever the user's recorder, computer, or other device should fail, the restoration server may then use the duplicate copy to restore that device to some state prior to the failure. The restoration server thus mirrors the content on the user's device.

Exemplary embodiments describe a method for recording media. An input is received via a user interface to record media. An entry is created in a recording schedule to record the media. The recording schedule is sent to a restoration server, such that the recording schedule is mirrored to the restoration server.

In another exemplary embodiment, another method is disclosed for recording media. A user's recording schedule is received, and the recording schedule indicates what media is scheduled for recording by the user's recording device. The recording schedule is mirrored in a restoration server such that the media is also scheduled for recording by the restoration server. A recording notification message is received that indicates the media is being recorded by the user's recording device. In response to the recording notification message, the restoration server simultaneously records the media, wherein the restoration server mirrors the media recorded by the user's recording device.

More exemplary embodiments describe a device for recording media. The device comprises a processor communicating with a user interface. The processor receives an input via the user interface to record media. The processor creates an entry in a recording schedule to record the media, and the processor sends the recording schedule to a restoration server. The processor thus mirrors the recording schedule to the restoration server.

Still more exemplary embodiments describe another device for recording media. A processor communicates with a network interface and with memory. The processor receives a user's recording schedule via the network interface, and the recording schedule indicates what media is scheduled for recording by the user's recording device. The processor mirrors the recording schedule to the memory such that the media is also scheduled for recording. The processor receives a recording notification message via the network interface that indicates the media is being recorded by the user's recording device. In response to the recording notification message, the processor receives the media via the network interface and records the media to the memory. The device thus mirrors the media recorded to the user's recording device.

Exemplary embodiments also include a computer program product for recording media. The computer program product stores computer code for receiving an input via a user interface to record media. An entry is created in a recording schedule to record the media. The recording schedule is sent to a restoration server, such that the recording schedule is mirrored to the restoration server.

Other exemplary embodiments include more computer program products. Here a user's recording schedule is received that indicates what media is scheduled for recording by the user's recording device. The recording schedule is mirror in a restoration server such that the media is also scheduled for recording by the restoration server. A recording notification message is received that indicates the media is being recorded by the user's recording device. In response to the recording notification message, the restoration server records the media, such that the restoration server mirrors the media recorded to the user's recording device.

Other systems, methods, and/or devices according to the exemplary embodiments will be or become apparent to one with skill in the art upon review of the following drawings and detailed description. It is intended that all such additional systems, methods, and/or devices be included within this description, be within the scope of the exemplary embodiments, and be protected by the accompanying claims.

BRIEF DESCRIPTION OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments now will be described more fully hereinafter with reference to the accompanying drawings. The reader should recognize, however, that the exemplary embodiments may be embodied in many different forms and should not be construed as limited to the embodiments set forth herein. These embodiments are provided so that this disclosure will be thorough and complete and will fully convey the scope of the exemplary embodiments. Moreover, all statements herein reciting exemplary embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods of the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the exemplary embodiments. Those of ordinary skill in the art further understand that the exemplary hardware, software, processes, methods, and/or operating systems described herein are for illustrative purposes and, thus, are not intended to be limited to any particular named manufacturer.

Figure 1:
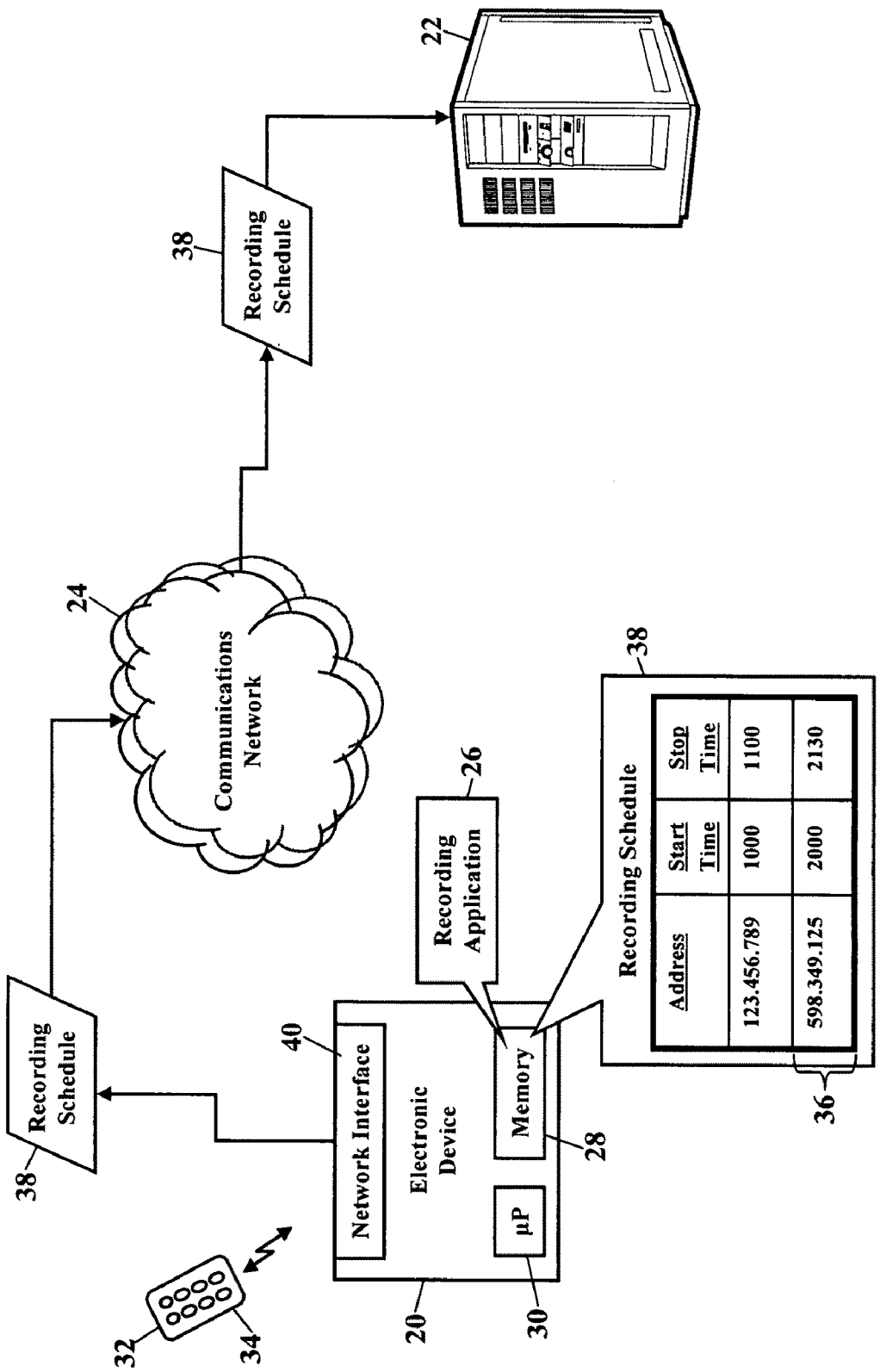
FIG. 1 is a schematic illustrating an operating environment, according to exemplary embodiments.

FIG. 1 is a schematic illustrating an operating environment, according to exemplary embodiments. FIG. 1 illustrates a user's electronic device 20 communicating with a restoration server 22 via a communications network 24. Although the user's electronic device 20 is generically shown, as later paragraphs will explain, the electronic device 20 may be a computer, set-top box, digital recorder, or any other communications device. The user's electronic device 20 stores a recording application 26 in memory 28. The recording application 26 includes processor-executable code or instructions that cause a processor 30 to record some media (e.g., movie, music, and/or image). The processor 30 also communicates with a user interface 32 for indicating what media is to be recorded. The user interface 32 is illustrated as a remote control 34, but the user interface 32 may be a control panel, keypad, keyboard, display, or any other means for receiving spoken or tactile inputs. The processor 30 receives an input via the user interface 32, and the input instructs the processor to create an entry 36 in a recording schedule 38. The recording schedule 36 is stored in the memory 28 and identifies the media selected for recording.

Here restoration server 22 mirrors the recording schedule 36. Whenever the user desires to schedule recording of a programming event or media, the processor 30 informs the restoration server 22. As FIG. 1 illustrates, the recording application 26 instructs the processor 30 to invoke a network interface 40 to communicate the recording schedule 36 to the restoration server 22. The processor 30 thus sends the recording schedule 36 via the communications network 24 to the restoration server 22. Exemplary embodiments thus mirror the user's recording schedule 36 to the restoration server 22.

The reader is assumed to be generally familiar with recording schedules. If, however, the reader desires more information, the reader is invited to consult the following sources, with each incorporated herein by reference in its entirety: U.S. Pat. No. 6,792,469 to Callahan et al. (Sep. 14, 2004); Published U.S. Patent Application 2002/0144289 to Taguchi et al. (Oct. 3, 2002); Published U.S. Patent Application 2003/0005432 to Ellis et al. (Jan. 2, 2003); Published U.S. Patent Application 2003/0131355 to Berenson et al. (Jul. 10, 2003); Published U.S. Patent Application 2003/0208767 to Williamson et al. (Nov. 6, 2003); Published U.S. Patent Application 2004/0008972 to Haken (Jan. 15, 2004); Published U.S. Patent Application 2004/0013409 to Beach et al. (Jan. 22, 2004); Published U.S. Patent Application 2004/0060063 to Russ et al. (Mar. 25, 2004); Published U.S. Patent Application 2004/0078817 to Horowitz et al. (Apr. 22, 2004); and Published U.S. Patent Application 2005/0229212 to Kuether et al. (Oct. 13, 2005).

Figure 2:
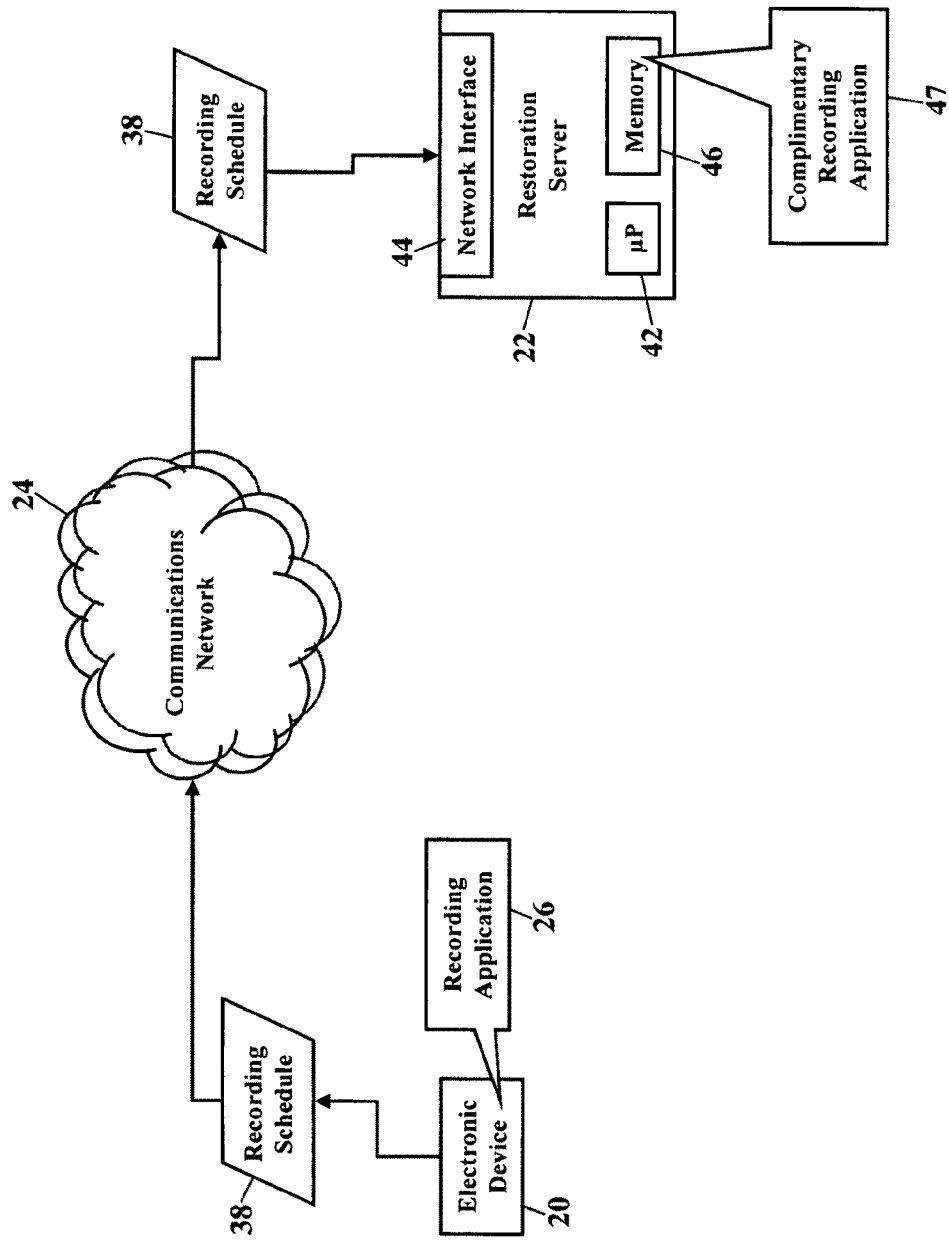
FIG. 2 is a schematic further illustrating the operating environment, according to more exemplary embodiments.

FIG. 2 is a schematic further illustrating the operating environment, according to more exemplary embodiments. Here the restoration server 22 is illustrated as a block diagram, with a restoration processor 42 communicating with a network interface 44 and with restoration memory 46. A complimentary recording application 47 stores in the restoration memory 46 of the restoration server 22. The complimentary recording application 47 includes processor-executable code or instructions that cause the restoration processor 42 to mirror the recording schedule 38 to the restoration memory 46. As FIG. 2 illustrates, the restoration processor 42 receives the user's recording schedule 38 via the network interface 44 to the communications network 24. The recording schedule 38 indicates what media is scheduled for recording by the user's electronic device 20. Because the restoration processor 42 mirrors the recording schedule 38 to the restoration memory 46, the user's selected media is also scheduled for recording by the restoration server 22.

Figure 3:
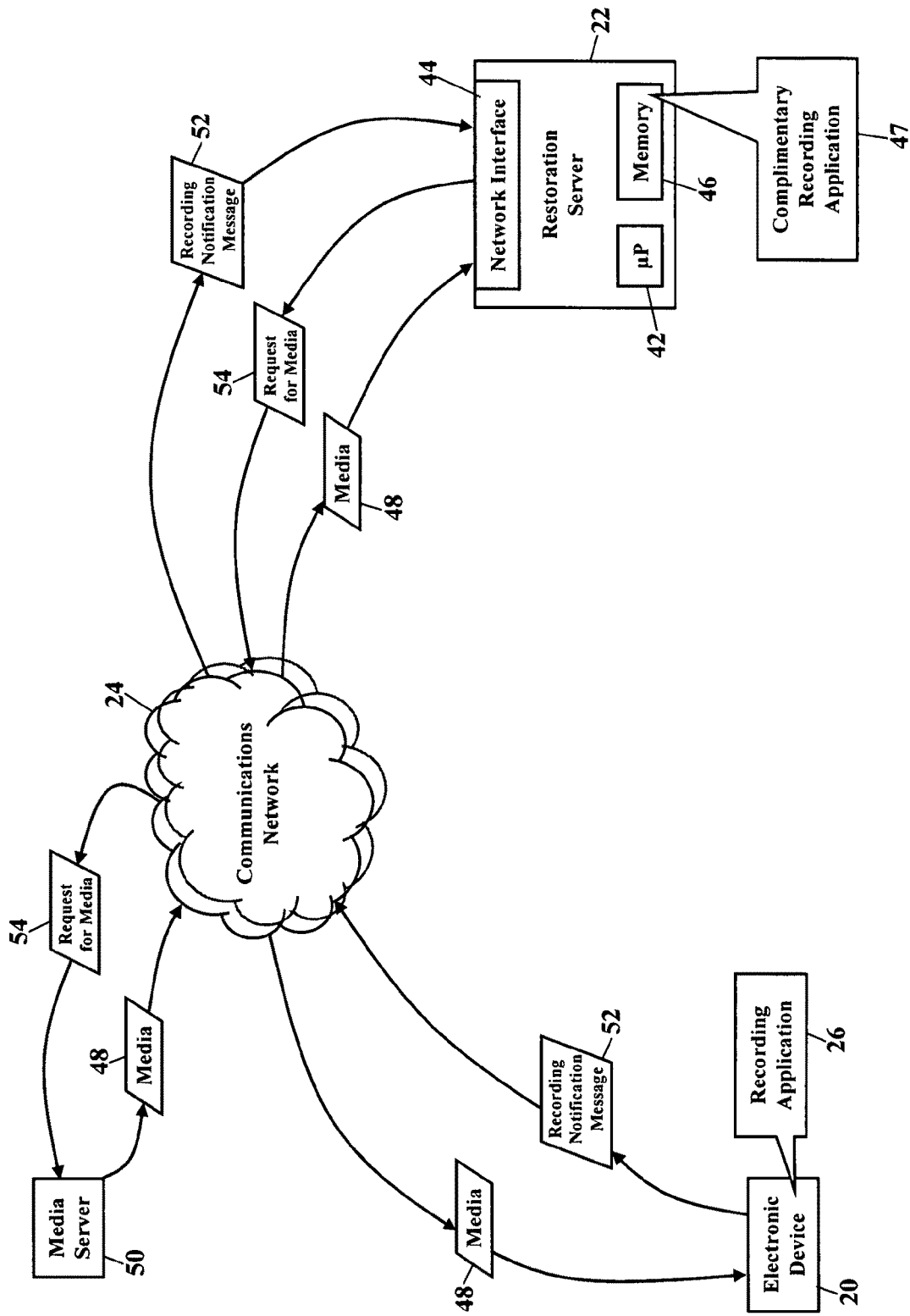
FIG. 3 is a schematic illustrating notification of recorded media, according to even more exemplary embodiments.

FIG. 3 is a schematic illustrating notification of recorded media, according to even more exemplary embodiments. Here the user's electronic device 20 notifies the restoration server 22 whenever the desired media is recorded. The user's electronic device 20 notifies the restoration server 22 whenever a recording mode of operation is invoked. As FIG. 3 illustrates, the user's electronic device 20 receives media 48 via the communications network 24. The media 48 is shown originating from a media server 50, but the media 48 may originate from any network location or peer device. When the user's electronic device 20 enters, or is about to enter, a recording mode of operation, the recording application 26 instructs the processor (shown as reference numeral 30 in FIG. 1) to send a recording notification message 52 to the restoration server 22. The recording notification message 52 notifies the restoration server 22 that the media 48 is being recorded. The recording notification message 52 may identify the media 48 being recorded or copied by title, programming identification, channel, path, link, start/end time, or other identifying information.

The restoration server 22 receives the recording notification message 52. The recording notification message 52 again indicates that the media 48 is being recorded by the user's electronic device 20. The restoration processor 42, in response to receipt of the recording notification message 52, requests and receives the same media 48 via the communications network 24. That is, the restoration processor 42 sends a request 54 to the media server 50 to send, deliver, or stream the media 48 to the restoration server 22. The restoration processor 42 receives the media 48 via the network interface 44 and simultaneously stores/records the media 48 to the restoration memory 46. The restoration server 22 thus mirrors the media 48 recorded by the user's electronic device 20. Whatever media is recorded by the user's electronic device 20, that same media is also recorded by the restoration server 22. As later paragraphs will greater explain, if ever the user's electronic device 20 should fail, the restoration server 22 may be used to restore the user's collection of recorded media.

Figure 4:
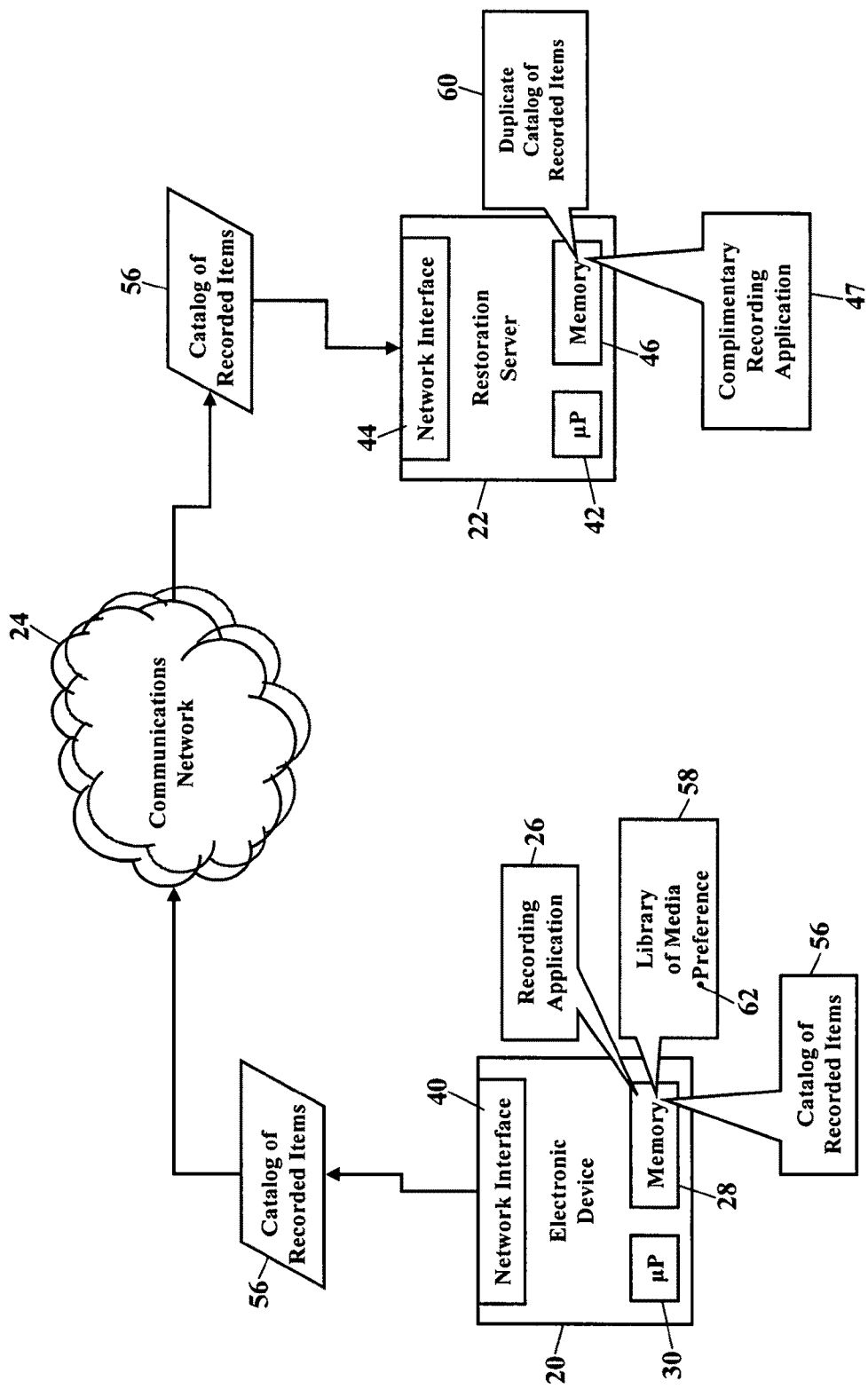
FIG. 4 is a schematic illustrating a catalog of recorded items, according to still more exemplary embodiments.

FIG. 4 is a schematic illustrating a catalog 56 of recorded items, according to still more exemplary embodiments. Here the user maintains a library 58 of media. The library 58 of media may be stored in the memory 28 of the user's electronic device 20. The library 58 of media, however, may additionally or alternatively be stored at any location within a home network and/or within the communications network 24. Wherever the user's library 58 of media is stored, the catalog 56 of recorded items is also maintained in the memory 28. The catalog 56 of recorded items describes some or all of the contents of the user's library 58 of media. The catalog 56 of recorded items, for example, may be a listing of titles in the user's library 58 of media. The catalog 56 of recorded items, however, may include any information that uniquely identifies each individual item in the user's library 58 of media. The catalog 56 of recorded items may even include additional information for each item in the library 58 of media, such as actor(s), actress(es), director, producer, setting, or any other descriptive information that may or may not uniquely identify each individual item.

As FIG. 4 illustrates, the catalog 56 of items may also be shared with the restoration server 22. The recording application 26 instructs the processor 30 to send the catalog 56 of items to the restoration server 22 via the communications network 24. When the restoration server 22 receives the catalog 56 of items, the restoration server 22 stores the catalog 56 of items in the restoration memory 46. The restoration server 22 thus maintains a duplicate catalog 60 of items that reside in the user's library 58 of media. If ever the user's electronic device 20 should fail, the restoration server 22 may use the duplicate catalog 60 of items to restore the user's collection of recorded media.

FIG. 4 also illustrates a preference 62. The preference 62 indicates what items in the user's library 58 of media are tagged for restoration. Some users may maintain a large library 58 of media containing many, if not hundreds or thousands, of movies, music, photos/images, books, and other content. Some user's library of media, in fact, may exceed a memory allocation (in bytes). The preference 62, then, indicates what items in the user's library 58 of media are tagged for restoration. If an item in the user's library 58 of media is tagged by the preference 62, then that item may be duplicately stored (or "backed-up") by the restoration server 22. If an item is not tagged by the preference 62, then the restoration server 22 may, or may not, maintain a duplicate copy.

The preference 62 is configurable. That is, the user may completely configure the preference 62 in any way to indicate what items are tagged for restoration. The user, for example, may individually designate an item for restoration. The user may additionally or alternative tag a family or category of items. The user may configure the preference 62 to include any measure of time, such as tagging every item recorded during the past hour, the previous Saturday night, within the previous week, within the previous two weeks, on May $10^{th}$, during the month of January, or any other measure of time. The user may configure the preference 62 to only restore media content residing on a particular device, such as a digital video recorder or computer hard drive. The recording application 26 may include intelligence to autonomously tag media content for restoration. The recording application 26, for example, may tag the user's popular media that is frequently accessed or played. Because the media is frequently played, the recording application 26 may determine that the preference 62 should identify the popular media.

The preference 62 may also be used to condense the catalog 56 of items. Recall that the preference 62 indicates what items in the user's library 58 of media are tagged for restoration. If not all items in the library 58 are tagged for restoration, then the user may configure the recording application 26 to condense the catalog 56 of items. If only some items are tagged for restoration, then the recording application 26 may delete items from the catalog that are not tagged. The recording application 26 may then instruct the processor 30 to send a condensed version of the catalog 56 of items to the restoration server 22. The condensed version of the catalog 56 of items may only include those items tagged for restoration.

Figure 5:
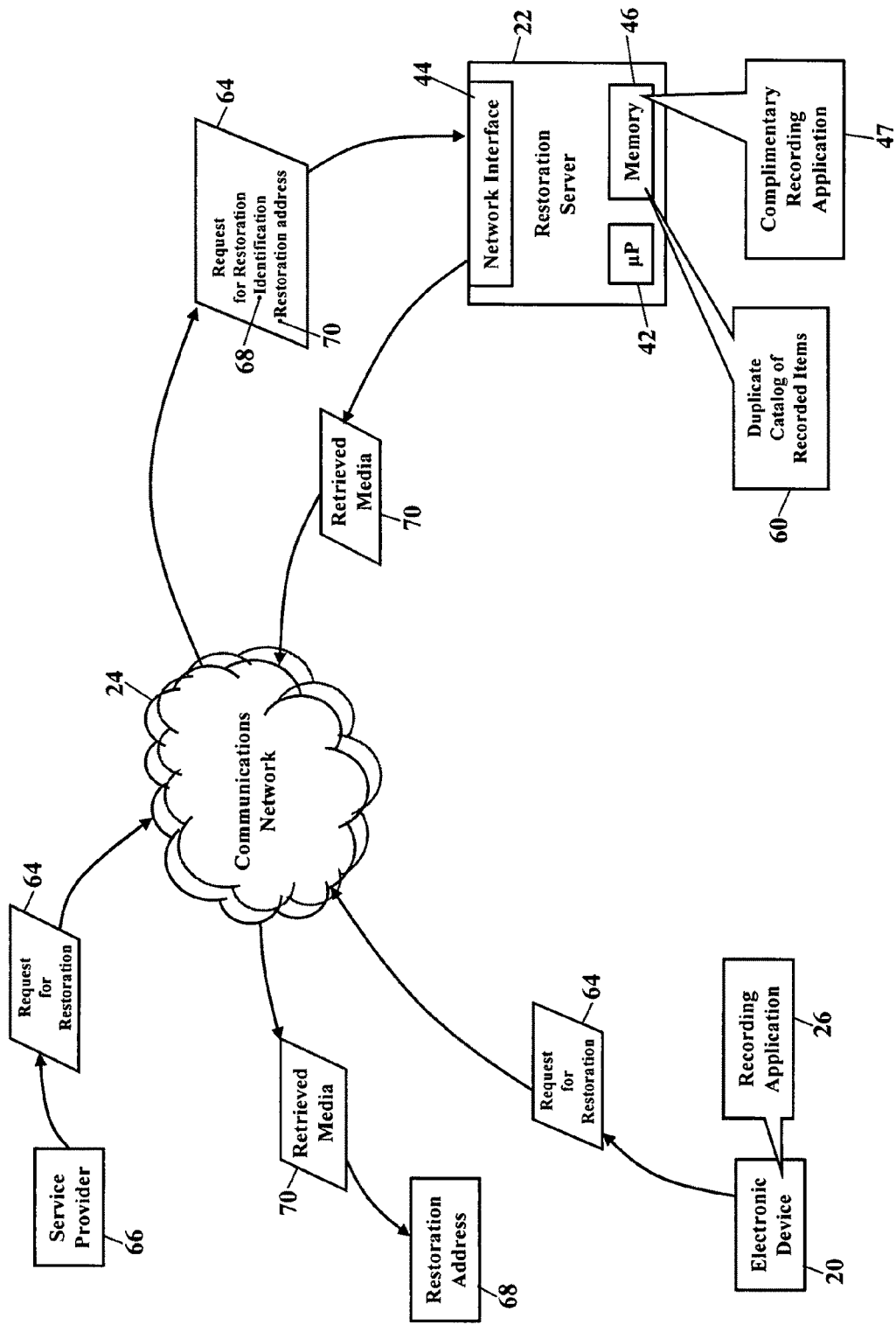
FIG. 5 is a schematic illustrating the restoration of media, according to even more exemplary embodiments.

FIG. 5 is a schematic illustrating the restoration of media, according to even more exemplary embodiments. Here the restoration server 22 receives a request 64 for restoration. The request 64 for restoration usually means the user has experienced some failure of the electronic device 20. The request 64 for restoration may originate from the electronic device 20 itself or from some other device associated with the user. The request 64 may also originate from a service provider 66.

Regardless from where the request 64 for restoration originates, the request 64 includes some identification 68 of the user and/or the user's catalog of items (the user's catalog of items is shown as reference numeral 56 in FIG. 4). The request 64 for restoration may also include a restoration address 70 that identifies to what communications address (e.g., I.P. address, email, or any other address) the restored media is sent. The complimentary recording application 47 instructs the restoration processor 42 to access the user's duplicate catalog 60 of items and to retrieve each item tagged for restoration. The restoration server 22 then sends each retrieved media item 70 to the restoration address 68. The restoration server 22 may even send each media item 70 during off-peak hours to repopulate the user's library of media (shown as reference numeral 58 in FIG. 4). The restoration server 22 may even utilize multicast streaming to simultaneously restore multiple devices. The restoration server 22 may alternatively utilize unicast streaming to individually restore each device. The complimentary recording application 47 may include logic to decide whether unicast or multicast streaming more efficiently accomplishes the restoration.

The restoration server 22 may also provide a status of the restoration. Because the time required for the restoration may depend on the available bitrate (the "last mile," for example, may be a limiting factor), the restoration server 22 may send periodic status updates. Each status update informs the user of the progress of the restoration. The status update may even calculate a remaining time until completion, based on the actual or average bitrate and the remaining bytes. The status update may additionally or alternatively provide the names of media titles (or other identifiers) that have been completely restored and are available for access.

Figure 6:
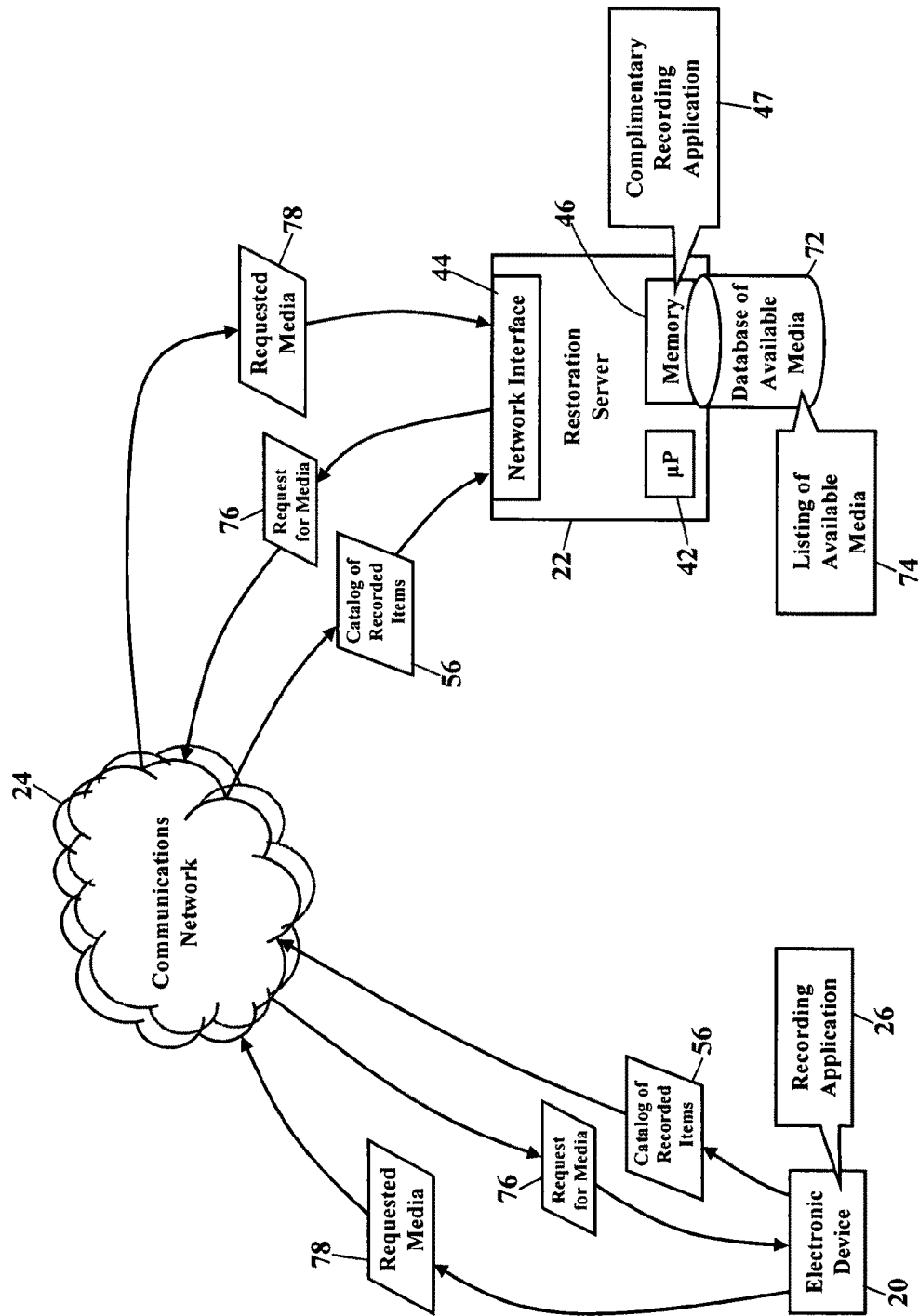
FIG. 6 is a schematic illustrating additional restoration procedures, according to even more exemplary embodiments.

FIG. 6 is a schematic illustrating additional restoration procedures, according to even more exemplary embodiments. As the previous paragraphs explained, the user's electronic device 20 may share the catalog 56 of recorded items with the restoration server 22. When the restoration server 22 receives the catalog 56 of items, the restoration server 22 stores the catalog 56 of items in the restoration memory 46. The restoration server 22 thus maintains the duplicate catalog 60 of items that reside in the user's library 58 of media. If ever the user's electronic device 20 should fail, the restoration server 22 may use the duplicate catalog 60 of items to restore the user's collection of recorded media.

The user's catalog 56 of items, however, may contain entries that are not available to the restoration server 22. The user's catalog 56 of items may contain well-known and/or commercially distributed movies and other programming (e.g., CASABLANCA® or STAR WARS®). The restoration server 22, when needed, may easily obtain an electronic copy of such media. The user's catalog 56 of items, however, may contain home movies, still images, and other media that are not elsewhere obtainable. Here, then, the complimentary recording application 47 may implement procedures to restore unique and/or difficult to obtain media.

FIG. 6 illustrates an example. When the restoration server 22 receives the user's catalog 56 of items, the restoration server 22 may compare the catalog 56 of items to a database 72 of available media. The database 72 of available media at least stores a listing 74 of all media available to the restoration server 22. If a media title, for example, is listed in the listing 74, then that media title is available to the restoration server 22. Any media not listed in the database 72 of available media, however, may not be available and duplicately recorded for restoration. A user's personal home movies, for example, would not ordinarily be listed in the database 72 of available media. When the complimentary recording application 47 encounters media not listed in the database 72 of available media, the complimentary recording application 47 may send a request 76 for media. The request 76 for media routes along the communications network 24 to the user's electronic device 20. The request 76 for media seeks to obtain any media stored in, or available from, the user's electronic device 20 that is not found in the database 72 of available media. The user's electronic device 20 then obtains or retrieves the requested media 78 and sends the requested media 78 to the restoration server 22. When the restoration server 22 receives the requested media 78, the requested media 78 is stored in the restoration memory 46. If ever the user's home movies, pictures, or other unique media requires restoration, the restoration server 22 may tap and retrieve a restoration copy from the restoration memory 46.

The user's unique media 78 may be sent during off-peak hours. Because the user's unique media, such as the user's collection of home movies, may be files of many gigabytes, such large files may be scheduled for transfer during periods of minimal bandwidth usage. Late nights and/or early mornings, for example, are usually periods in which demand is least. The user's electronic device 20, additionally, may have an asymmetric broadband connection, in which uploaded data travels slower that downloaded data. The recording application 26 and the complimentary recording application 47 may negotiate a desirable time of day and connection/session parameters in which to mirror the user's unique collection of media.

Figure 7:
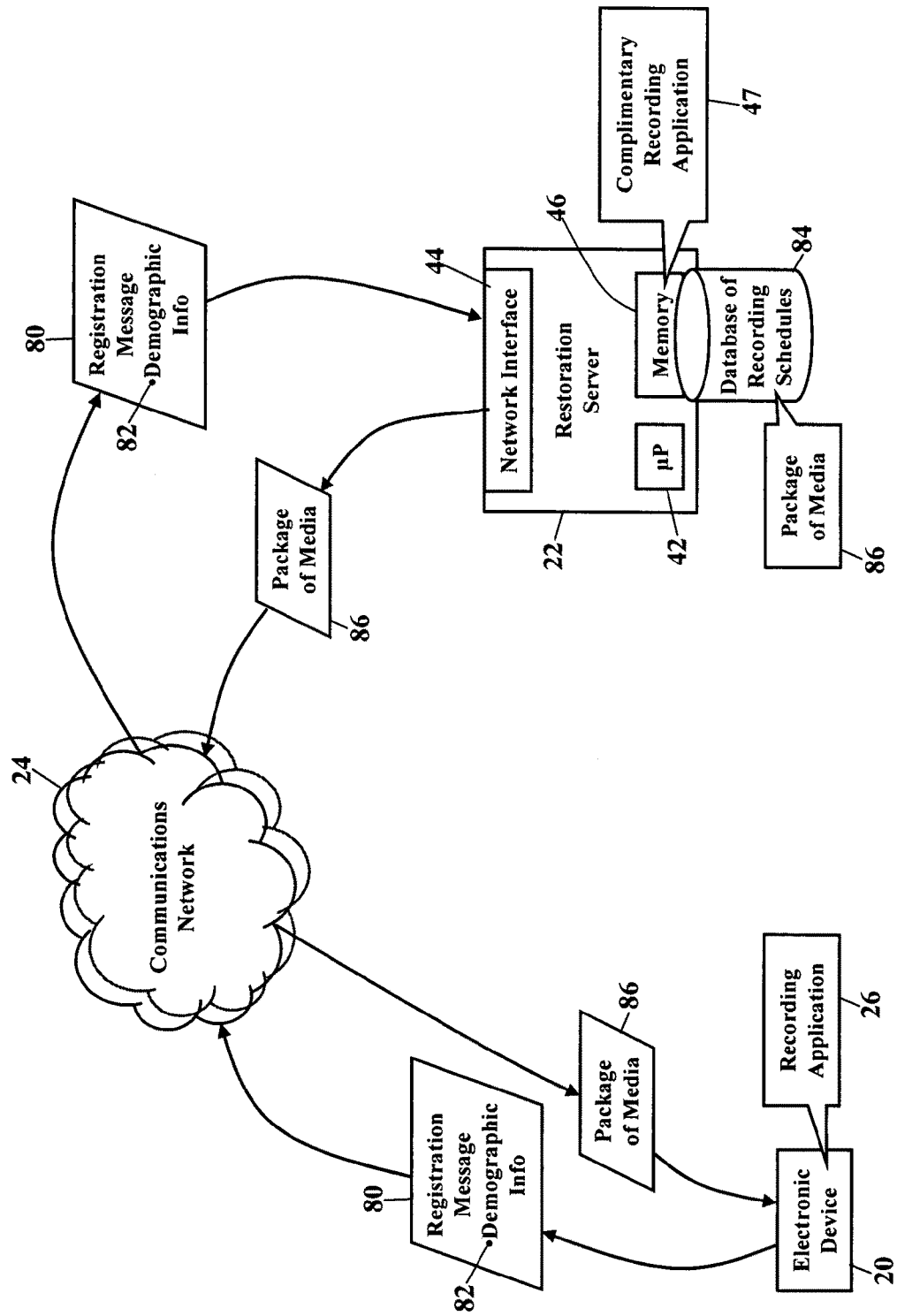
FIG. 7 is a schematic illustrating packages of media, according to more exemplary embodiments.

FIG. 7 is a schematic illustrating packages of media, according to more exemplary embodiments. Recording schedules may also be used to initially populate recording devices. As the restoration server 22 obtains more and more customers' recording schedules, those recording schedules may be analyzed for patterns and/or for popularity. A service provider, for example, may determine what media content is most requested for recording by customers. The service provider, then, may offer individual media, or packages of media, based upon an analysis of customers' recording schedules.

FIG. 7 illustrates an example. Here the restoration server 22 makes a package of media available to new users. When the user's electronic device 20 initially registers with the restoration server 22, the user's electronic device 20 sends a registration message 80. The recording application 26 instructs the processor (shown as reference numeral 30 in FIG. 1) to send the registration message 80 to the restoration server 22. The registration message 80 communicates via the communications network 24 and requests registration for a restoration service. The registration message 80 may identify the user and/or the user's electronic device 20, such as by an account number, customer name, I.P. address, processor serial number, or any other identifying information. The registration message 80 may even include demographic information 82 that helps identify media preferences for the registering user. When the user's electronic device 20, for example, is initially powered or configured, the recording application 26 have a configuration routine that prompts for the demographic information 82. The user may thus voluntarily enter non-identifying information, such as age bracket, income bracket, male/female user, ZIP code, education level, and any other anonymous information. The user may even enter preferred categories of media, such as westerns, actions, do-it-yourself programming, classic films, and any other genre, category, and/or titles. The user, of course, may also enter specific demographic information, such as user name, children's ages, religious and/or professional affiliations, and other more revealing demographic identifiers.

The restoration server 22 receives the registration message 80. Because the user's electronic device 20 may be initially registering with the restoration server 22, the complementary recording application 47 may decide to populate the user's electronic device 20 with media. The complementary recording application 47 may access a database 84 of recording schedules. Each user's recording schedule may be stored in the database 84 of recording schedules. The database 84 of recording schedules may be analyzed to determine media or packages of media that appeal to a population or base of users. The complementary recording application 47, for example, may identify a package 86 of media that is frequently recorded by users. The package 86 of media may additionally or alternatively be tailored to the demographic information 82 included with the registration message 80. The complementary recording application 47 retrieves each media in the package 86 of media and sends the package 86 to the user's device 20. The package 86 of media thus populates the user's electronic device 20 with media.

Exemplary embodiments are applicable to any communications network. The communications network 24, for example, may be a cable network operating in the radio-frequency domain and/or the Internet Protocol (IP) domain. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the IEEE 802 family of standards).

Figure 8:
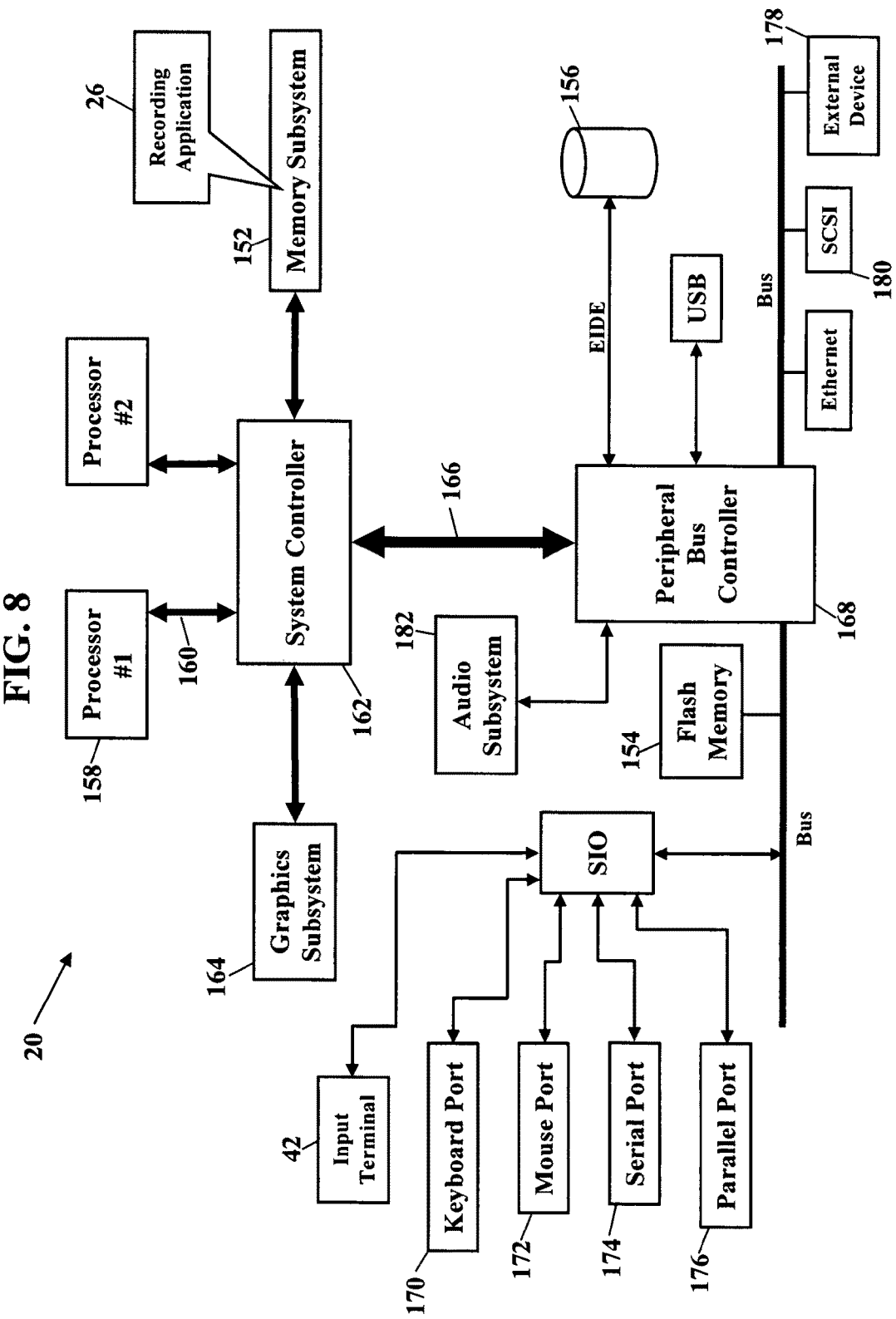
FIG. 8 is a block diagram of exemplary details of the electrical device shown in FIGS. 1-7.

FIG. 8 is a block diagram of exemplary details of the electrical device 20 shown in FIGS. 1-7. The electronic device 20 may be any device capable of recording any media. The electrical device 20, for example, may be any device, such as an analog/digital recorder, television, CD/DVD player/recorder, audio equipment, receiver, tuner, and/or any other consumer electronic device. The electrical device 20 may also include any computer, peripheral device, camera, modem, storage device, telephone, personal digital assistant, and/or mobile phone. The electrical device 20 may also be configured as a set-top box ("STB") receiver that receives and decodes digital signals. The electrical device 20, in fact, can be any electronic/electrical device that has an input 150 for receiving an input (such as the media 48 shown in FIG. 3). The input 150 may include a coaxial cable interface for receiving signals via a coaxial cable (not shown). The input 150 may additionally or alternatively include an interface to a fiber optic line, to a telephone line (such as an RJ-48/56), to other wiring, and to any male/female coupling. The recording application 26 operates within a system memory device. The recording application 26, for example, is shown residing in a memory subsystem 152. The recording application 26, however, could also reside in flash memory 154 or peripheral storage device 156. The electrical device 20 also has one or more central processors 158 executing an operating system. The operating system, as is well known, has a set of instructions that control the internal functions of the electrical device 20. A system bus 160 communicates signals, such as data signals, control signals, and address signals, between the central processor 158 and a system controller 162. The system controller 162 provides a bridging function between the one or more central processors 158, a graphics subsystem 164, the memory subsystem 152, and a PCI (Peripheral Controller Interface) bus 166. The PCI bus 166 is controlled by a Peripheral Bus Controller 168. The Peripheral Bus Controller 168 is an integrated circuit that serves as an input/output hub for various peripheral ports. These peripheral ports could include, for example, a keyboard port 170, a mouse port 172, a serial port 174, and/or a parallel port 176 for a video display unit, one or more external device ports 178, and external hard drive ports 180 (such as IDE, ATA, SATA, or SCSI). The Peripheral Bus Controller 168 could also include an audio subsystem 182. The electrical device 20 may also include a display device (such as LED, LCD, plasma, or any other) to present instructions, messages, tutorials, and other information to a user. The electrical device 20 may further include one or more encoders, one or more decoders, input/output control, logic, one or more receivers/transmitters/transceivers, one or more clock generators, one or more Ethernet/LAN interfaces, one or more analog-to-digital converters, one or more digital-to-analog converters, one or more "Firewire" interfaces, one or more modem interfaces, and/or one or more PCMCIA interfaces. Those of ordinary skill in the art understand that the program, processes, methods, and systems described herein are not limited to any particular architecture or hardware.

One example of the central processor 158 is a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

According to an exemplary embodiment, any of the WINDOWS® (WINDOWS® is a registered trademark of Microsoft Corporation, One Microsoft Way, Redmond Wash. 98052-6399, 425.882.8080, www.Microsoft.com) operating systems may be used. Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described herein are not limited to any particular operating system.

The system memory device (shown as memory subsystem 152, flash memory 154, or peripheral storage device 156) may also contain an application program. The application program cooperates with the operating system and with a video display unit (via the serial port 174 and/or the parallel port 176) to provide a Graphical User Interface (GUI). The Graphical User Interface typically includes a combination of signals communicated along the keyboard port 170 and the mouse port 172. The Graphical User Interface provides a convenient visual and/or audible interface with a user of the electrical device 20.

Figure 9:
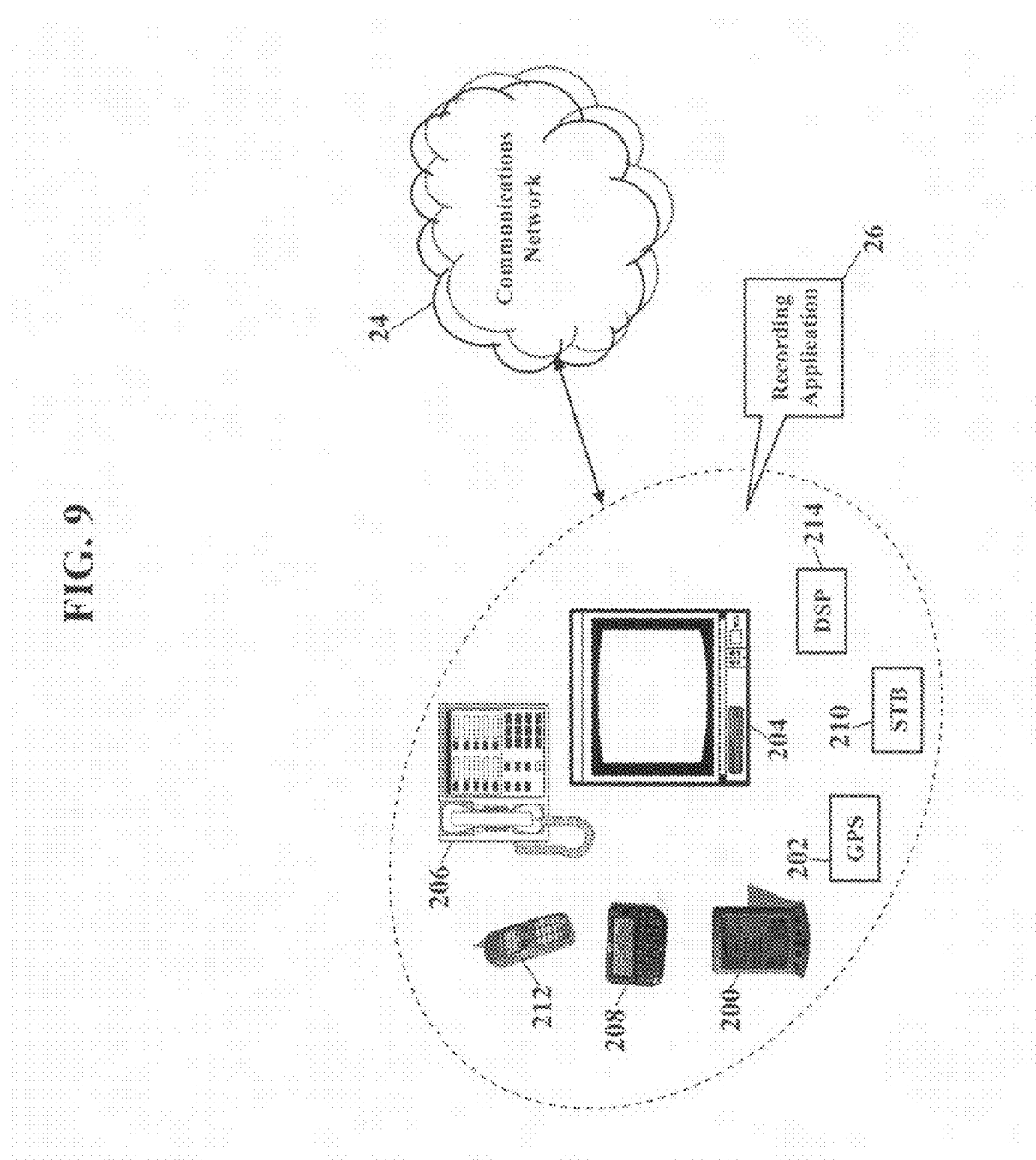
FIG. 9 is a schematic illustrating additional communications devices in which exemplary embodiments may operate.

FIG. 9 is a schematic illustrating still more exemplary embodiments. FIG. 9 illustrates that the recording application 26 may alternatively or additionally operate within various other communications devices. FIG. 9, for example, illustrates that the recording application 26 may entirely or partially operate within a personal digital assistant (PDA) 200, a Global Positioning System (GPS) device 202, an interactive television 204, an Internet Protocol (IP) phone 206, a pager 208, a set-top-box (STB) 210, a cellular/satellite phone 212, or any computer system and/or communications device utilizing a digital signal processor (DSP) 214. The communications device may also include watches, radios, vehicle electronics, clocks, printers, gateways, and other apparatuses and systems.

The recording application 26 may be utilized regardless of signaling standard. As those of ordinary skill in the art recognize, some communications devices utilize a Global System for Mobile (GSM) standard. Some other communications devices utilize the Time Division Multiple Access signaling standard, the Code Division Multiple Access signaling standard, the "dual-mode" GSM-ANSI Interoperability Team (GAIT) signaling standard, or a variant of the GSM/CDMA/TDMA signaling standard. Exemplary embodiments, however, may be applied to any communications device utilizing any signaling standard or compression technique. Exemplary embodiments may also be applied to any device utilizing any portion of the electromagnetic spectrum, such as the Industrial, Scientific, and Medical band (e.g., BLUETOOTH®).

Figure 10:
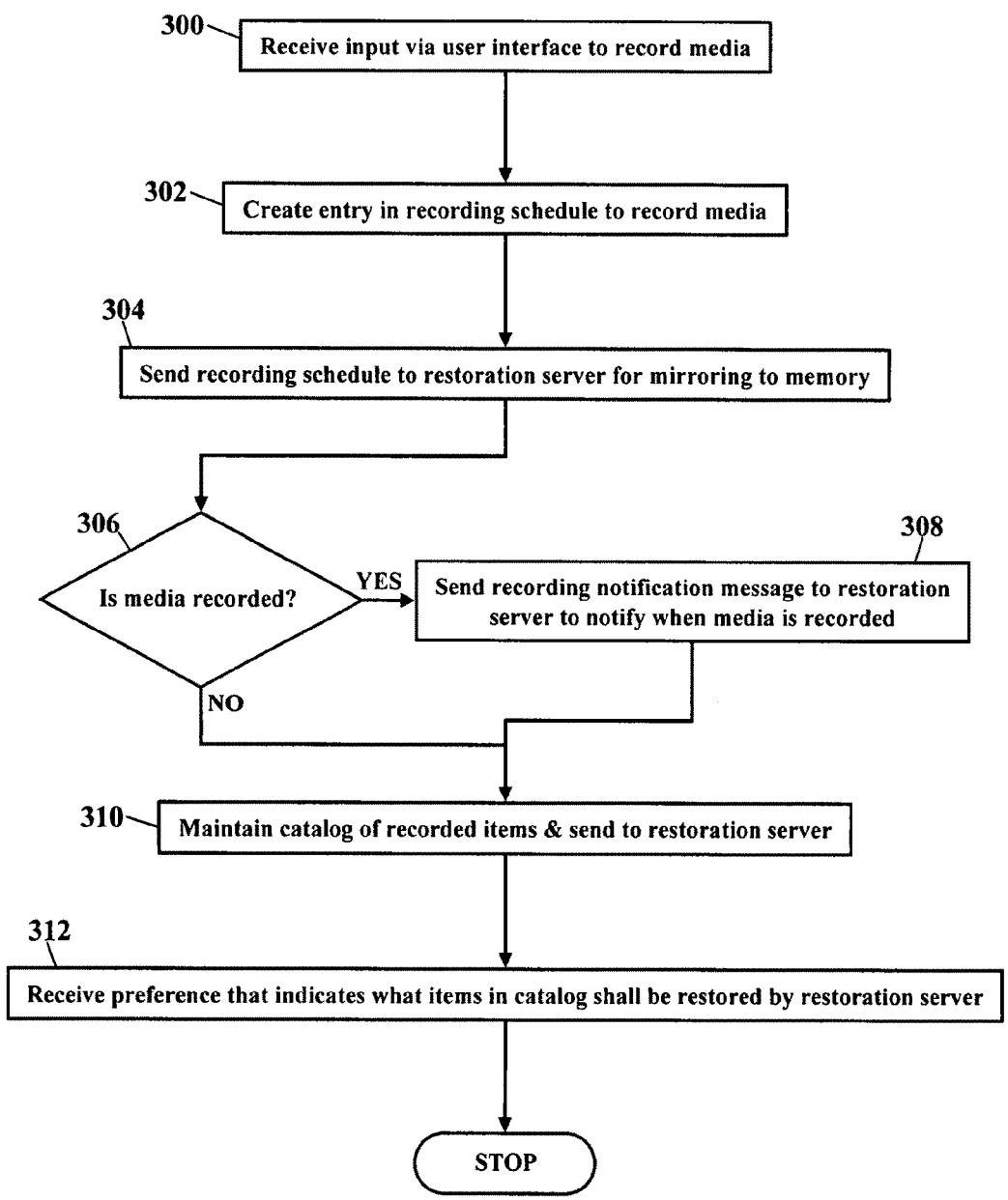
FIGS. 10 and 11 are flowcharts illustrating methods for recording media.

FIG. 10 is a flowchart illustrating a method for recording media. An input is received via a user interface to record media (Block 300). An entry is created in a recording schedule to record the media (Block 302). The recording schedule is sent to a restoration server and mirror to memory (Block 304). If the media is recorded (Block 306), then a recording notification message is sent to the restoration server to notify the restoration server when the media is recorded (Block 308). A catalog of recorded items is maintained and sent to the restoration server (Block 310). A preference is received that indicates what items in the catalog shall be restored by the restoration server (Block 312).

Figure 11:
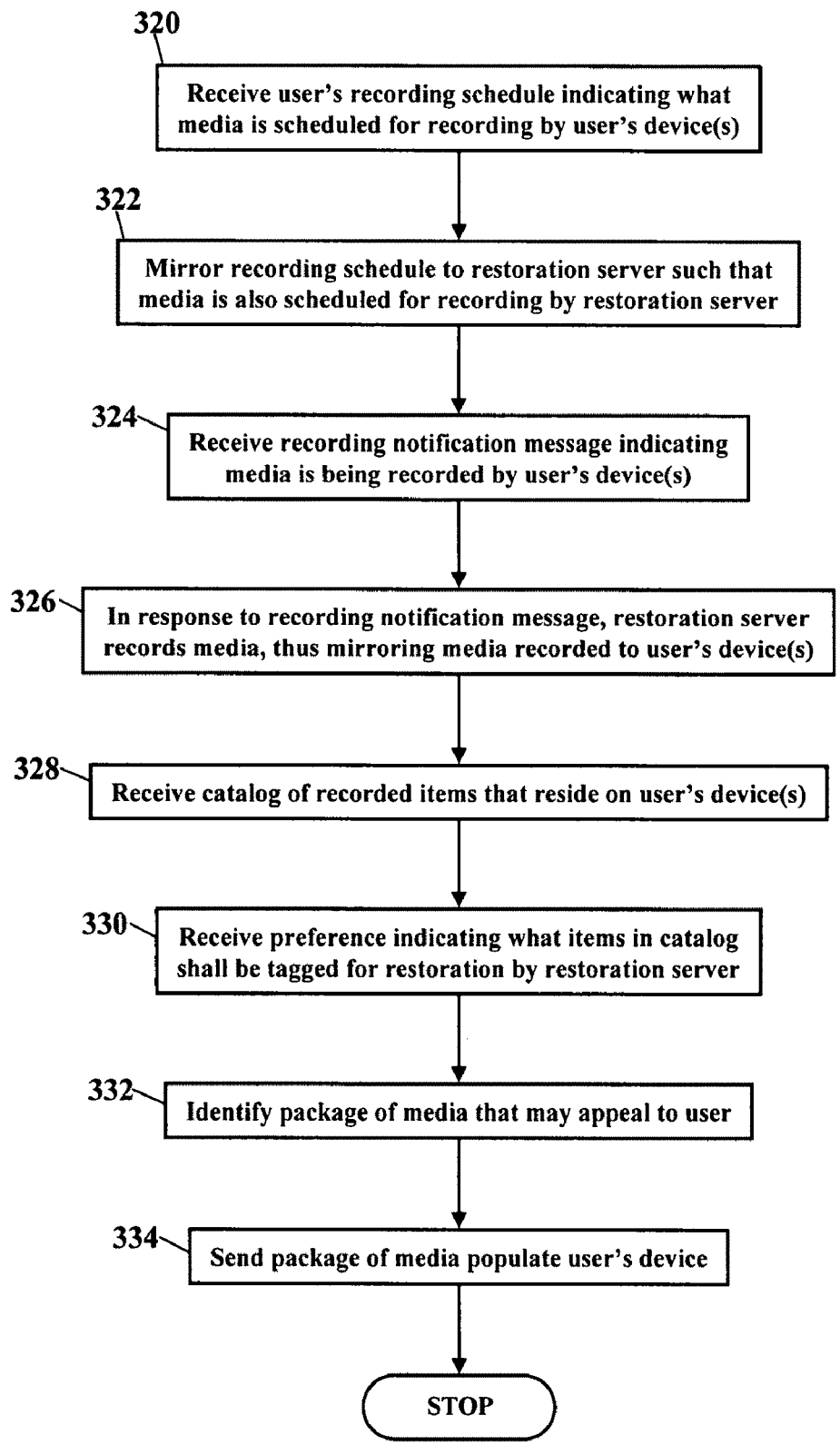

FIG. 11 is another flowchart illustrating another method for recording media. A user's recording schedule is received that indicates what media is scheduled for recording by the user's device (Block 320). The recording schedule is mirrored to a restoration server such that the media is also scheduled for recording by the restoration server (Block 322). A recording notification message is received that indicates the media is being recorded by the user's device (Block 324). In response to the recording notification message, the restoration server records the media, thus mirroring the media recorded to the user's device (Block 326). A catalog of recorded items, that reside on the user's device, is received (Block 328). A preference is received that indicates what items in the catalog shall be tagged for restoration by the restoration server (Block 330). A package of media is identified that may appeal to the user (Block 332). The package of media is sent to the user's device to populate the user's device (Block 334).

The recording application 26 may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the embodiments, allow the recording application 26 to be easily disseminated. A computer program product for recording media comprises the computer-readable medium, and the recording application 26 stores on the computer-readable medium as processor-executable code or instructions.

The recording application 26 may also be physically embodied on or in any addressable (e.g., HTTP, IEEE 802.11, Wireless Application Protocol (WAP)) wire line or wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method for recording media, comprising:
   receiving an input via a user interface to record media;
   creating an entry in a recording schedule to record the media, the media being recorded at a user device in response to the recording schedule;
   sending the recording schedule to a restoration server, wherein the recording schedule is mirrored to the restoration server, the restoration server for recording the media in response to the recording schedule to create a duplicate recording of the media at the restoration server;
   sending a notification by the user device to the restoration server, the notification causing the restoration server to simultaneously record the media while the user device is recording the media, wherein the notification indicates that the media is being recorded on the user device;
   maintaining a catalog of recorded items and sending the catalog to the restoration server, the catalog comprising:
      currently available media, and
      personal media which is only stored on the user device and not currently available; and
   responsive to the restoration server requesting, from the user device, the personal media which is only stored on the user device and not currently available, transmitting the personal media by the user device to the restoration server for recording a second copy of the personal media by the restoration server.

2. A method according to claim 1, wherein when a recording mode at the user device is invoked to record the media at the user device, the user device sends a recording notification message to the restoration server for the restoration server to duplicate the media being recorded by the user device.

3. A method according to claim 1, wherein the personal media comprises media that is not obtainable elsewhere including home movies, still images, and unique media.

4. A method for recording media, comprising:
   receiving a user's recording schedule indicating what media is scheduled for recording by the user's device;
   mirroring the recording schedule in a restoration server such that the media is also scheduled for recording by the restoration server;

receiving a recording notification message that indicates the media is being recorded by the user's device;

in response to the recording notification message that indicates the media is being recorded by the user's device, simultaneously recording the media to the restoration server to create a duplicate recording of the media at the restoration server, wherein the restoration server mirrors the media recorded to the user's device;

receiving a catalog of recorded items, the catalog comprising:
  currently available media, and
  personal media which is only stored on the user device and not currently available;

requesting, from the user's device, the personal media which is only stored on the user's device and not currently available; and receiving the personal media from the user's device to record a second copy of the personal media.

5. A method according to claim 4, further comprising receiving a preference that indicates what items in the catalog shall be tagged for restoration by the restoration server.

6. A method according to claim 4, further comprising identifying a package of media that may appeal to the user and sending the package of media to the user's device, the package of media populating the user's device.

7. A device, comprising:
a processor communicating with a user interface,
the processor receiving an input via the user interface to record media,
the processor creating an entry in a recording schedule to record the media, the media being recorded at a user device in response to the recording schedule, and
the processor sending the recording schedule to a restoration server,
wherein the processor mirrors the recording schedule to the restoration server, the restoration server for recording the media in response to the recording schedule to create a duplicate recording of the media at the restoration server; and
wherein the processor:
sends a notification to the restoration server, the notification causing the restoration server to simultaneously record the media while a device is recording the media, wherein the notification indicates that the media is being recorded on the device;
maintains a catalog of recorded items and sends the catalog to the restoration server, the catalog comprising:
  currently available media, and
  personal media which is only stored on the device and not currently available; and
responsive to the restoration server requesting, from the device, the personal media which is only stored on the device and not currently available, transmit the personal media to the restoration server for recording a second copy of the personal media by the restoration server.

8. A device according to claim 7, wherein when the media is recorded, the processor sends a recording notification message to the restoration server to notify the restoration server that the media is being recorded.

9. A device according to claim 7, wherein the processor receives a preference via the user interface that indicates what items in the catalog shall be tagged for restoration.

10. A device, comprising:
a processor communicating with a network interface and with memory,
the processor receiving a user's recording schedule via the network interface, the recording schedule indicating what media is scheduled for recording by the user's device,
the processor mirroring the recording schedule to the memory such that the media is also scheduled for recording,
the processor receiving a recording notification message via the network interface that indicates the media is being recorded by the user's device, and
in response to the recording notification message indicating that the media is being recorded by the user's device, the processor receives the media via the network interface and simultaneously records the media to the memory to create a duplicate recording of the media at the restoration server at the same time the user's device records the media, wherein the device mirrors the media recorded by the user's device; and
wherein the processor:
receives a catalog of recorded items, the catalog comprising:
  currently available media, and
  personal media which is only stored on the user's device and not currently available;
request, from the user's device, the personal media which is only stored on the user's device and not currently available; and
receive the personal media from the user's device to record a second copy of the personal media.

11. A device according to claim 10, wherein the processor receives a preference that indicates what items in the catalog shall be tagged for restoration.

12. A device according to claim 10, wherein the processor identifies a package of media that may appeal to the user and the processor sends the package of media to the user's device, the package of media populating the user's device.

13. A computer program product storing computer code for performing:
receiving an input via a user interface to record media;
creating an entry in a recording schedule to record the media, the media being recorded at a user device in response to the recording schedule;
sending the recording schedule to a restoration server,
wherein the recording schedule is mirrored to the restoration server, the restoration server for recording the media in response to the recording schedule to create a duplicate recording of the media at the restoration server;
sending a notification to the restoration server, the notification causing the restoration server to simultaneously record the media while a device is recording the media, wherein the notification indicates that the media is being recorded on the device;
maintaining a catalog of recorded items and sends the catalog to the restoration server, the catalog comprising:
  currently available media, and
  personal media which is only stored on the device and not currently available; and
responsive to the restoration server requesting, from the device, the personal media which is only stored on the device and not currently available, transmitting the personal media to the restoration server for recording a second copy of the personal media by the restoration server.

14. A computer program product according to claim 13, further comprising computer code for sending a recording notification message to the restoration server when the media is recorded, such that the restoration server is notified when the media is recorded.

15. A computer program product storing computer code for performing:

receiving a user's recording schedule indicating what media is scheduled for recording by the user's device;

mirroring the recording schedule in a restoration server such that the media is also scheduled for recording by the restoration server;

receiving a recording notification message that indicates the media is being recorded by the user's device;

in response to the recording notification message, simultaneously recording the media to the restoration server to create a duplicate recording of the media at the restoration server while the user's device records the media, wherein the restoration server mirrors the media recorded to the user's device;

receiving a catalog of recorded items, the catalog comprising:

currently available media, and personal media which is only stored on the user device and not currently available;

requesting, from the user's device, the personal media which is only stored on the user's device and not currently available; and receiving the personal media from the user's device to record a second copy of the personal media.

16. A computer program product according to claim 15, further comprising computer code for i) receiving the catalog of recorded items that reside on the user's device and ii) receiving a preference that indicates what items in the catalog shall be tagged for restoration by the restoration server.

17. A method according to claim 4, further comprising comparing items in the catalog of recorded items that reside on the user's device to a database of available media, and creating a duplicate recording of items that reside on the user's device that are not found in the database of available media.

* * * * *